(12) United States Patent
Tanaka

(10) Patent No.: US 6,781,633 B2
(45) Date of Patent: *Aug. 24, 2004

(54) LENS CONTROL APPARATUS, LENS CONTROL METHOD, AND VIDEO CAMERA HAVING SAME

(75) Inventor: Taeko Tanaka, Yokohama (JP)

(73) Assignee: Canon Kabushki Kaisha, Tokyo (JP)

( * ) Notice: Subject to any disclaimer, the term of this patent is extended or adjusted under 35 U.S.C. 154(b) by 248 days.

This patent is subject to a terminal disclaimer.

(21) Appl. No.: 09/739,370

(22) Filed: Dec. 19, 2000

(65) Prior Publication Data

US 2001/0000435 A1 Apr. 26, 2001

Related U.S. Application Data

(63) Continuation of application No. 08/615,815, filed on Mar. 14, 1996, now Pat. No. 6,184,932.

(30) Foreign Application Priority Data

Mar. 27, 1995 (JP) .............................................. 7-067775

(51) Int. Cl.[7] .............................................. H04N 5/232
(52) U.S. Cl. ........................ 348/347; 348/358; 348/349
(58) Field of Search .................................. 348/347, 348, 348/349, 350, 351, 354, 358, 369; 359/694, 695, 696, 697, 698; H04N 5/232

(56) References Cited

U.S. PATENT DOCUMENTS

| | | | | | |
|---|---|---|---|---|---|
| 5,223,981 | A | * | 6/1993 | Kaneda ....................... | 359/698 |
| 5,323,200 | A | * | 6/1994 | Hirasawa ..................... | 348/347 |
| 5,432,552 | A | * | 6/1995 | Takuma et al. .............. | 349/349 |
| 5,436,684 | A | * | 7/1995 | Hirasawa ..................... | 348/347 |
| 5,638,217 | A | * | 6/1997 | Hirasawa et al. ........... | 359/698 |

* cited by examiner

Primary Examiner—Tuan Ho
(74) Attorney, Agent, or Firm—Fitzpatrick, Cella, Harper & Scinto

(57) ABSTRACT

A video camera having a variator lens and focus lens which calculates in-focus positions varying with the drive of the variator lens based on previously stored in-focus position data, and performs the calculation a plurality of times during a period of a vertical-synchronizing signal in an image signal.

19 Claims, 11 Drawing Sheets

EXAMPLE OF LENS LOCUS INFORMATION USED FOR CONTROLLING INTERNAL FOCUSING-TYPE LENS SYSTEM

EXAMPLE OF LOCUS FOLLOW-UP METHOD

A (n, v)

| v \ n | 0 | 1 | 2 | 3 | --- | k | --- | m |
|---|---|---|---|---|---|---|---|---|
| 0 | A00 | A10 | A20 | A30 | --- | Ak0 | --- | Am0 |
| 1 | A01 | A11 | A21 | A31 | --- | Ak1 | --- | Am1 |
| 2 | A02 | A12 | A22 | A32 | --- | Ak2 | --- | Am2 |
| 3 | A03 | A13 | A23 | A33 | --- | Ak3 | --- | Am3 |
| ⋮ | ⋮ | ⋮ | ⋮ | ⋮ | | | | |
| k | A0k | A1k | A2k | A3k | --- | Akk | --- | Amk |
| ⋮ | ⋮ | ⋮ | ⋮ | ⋮ | | | | |
| s | A0s | A1s | A2s | A3s | --- | Aks | --- | Ams |

INTERPOLATION METHOD OF VARIATOR LENS POSITION $$a_x = a_k - \frac{(z_k - z_x)(a_k - a_{k-1})}{(z_k - z_{k-1})}$$

$$b_x = b_k - \frac{(z_k - z_x)(b_k - b_{k-1})}{(z_k - z_{k-1})}$$

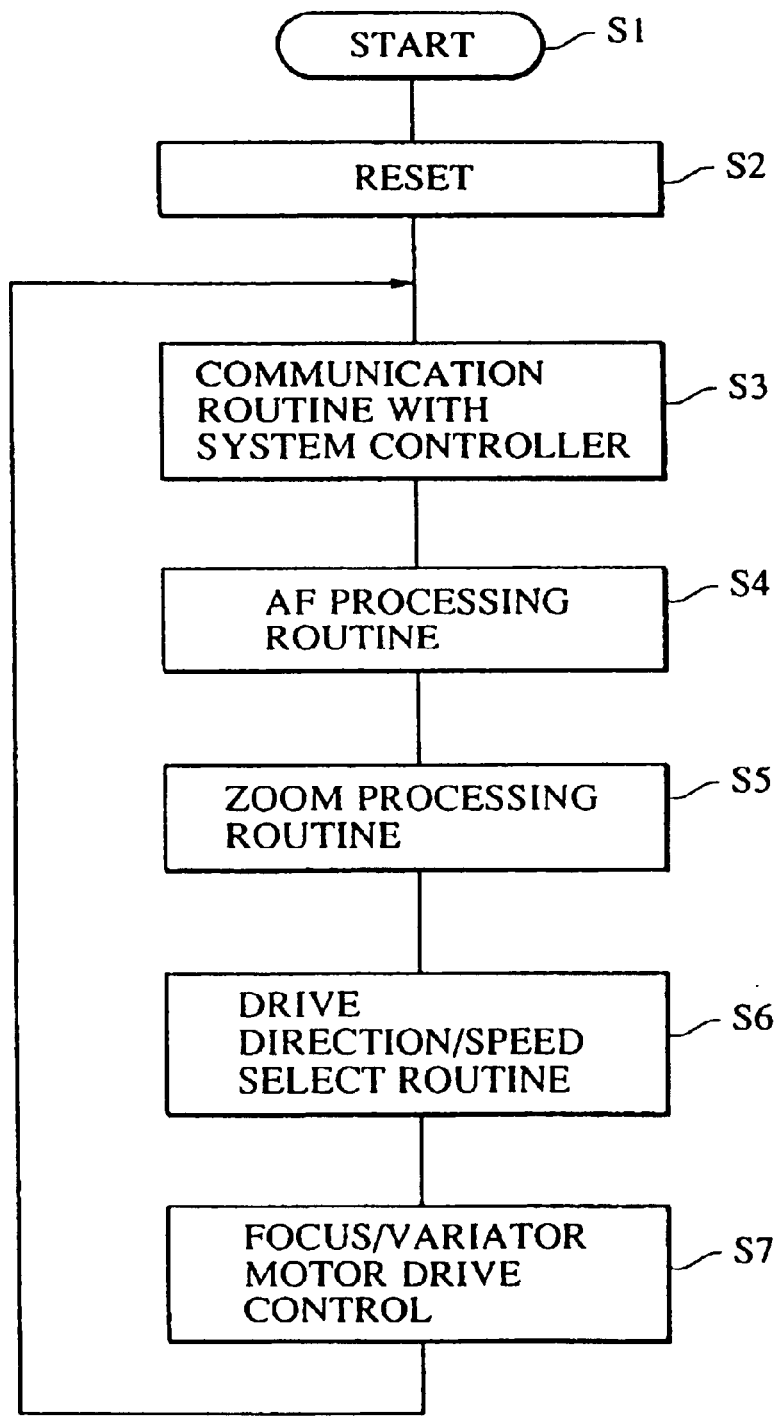

CONFIGURATION OF FIRST EMBODIMENT

OPERATION OF 1ST EMBODIMENT

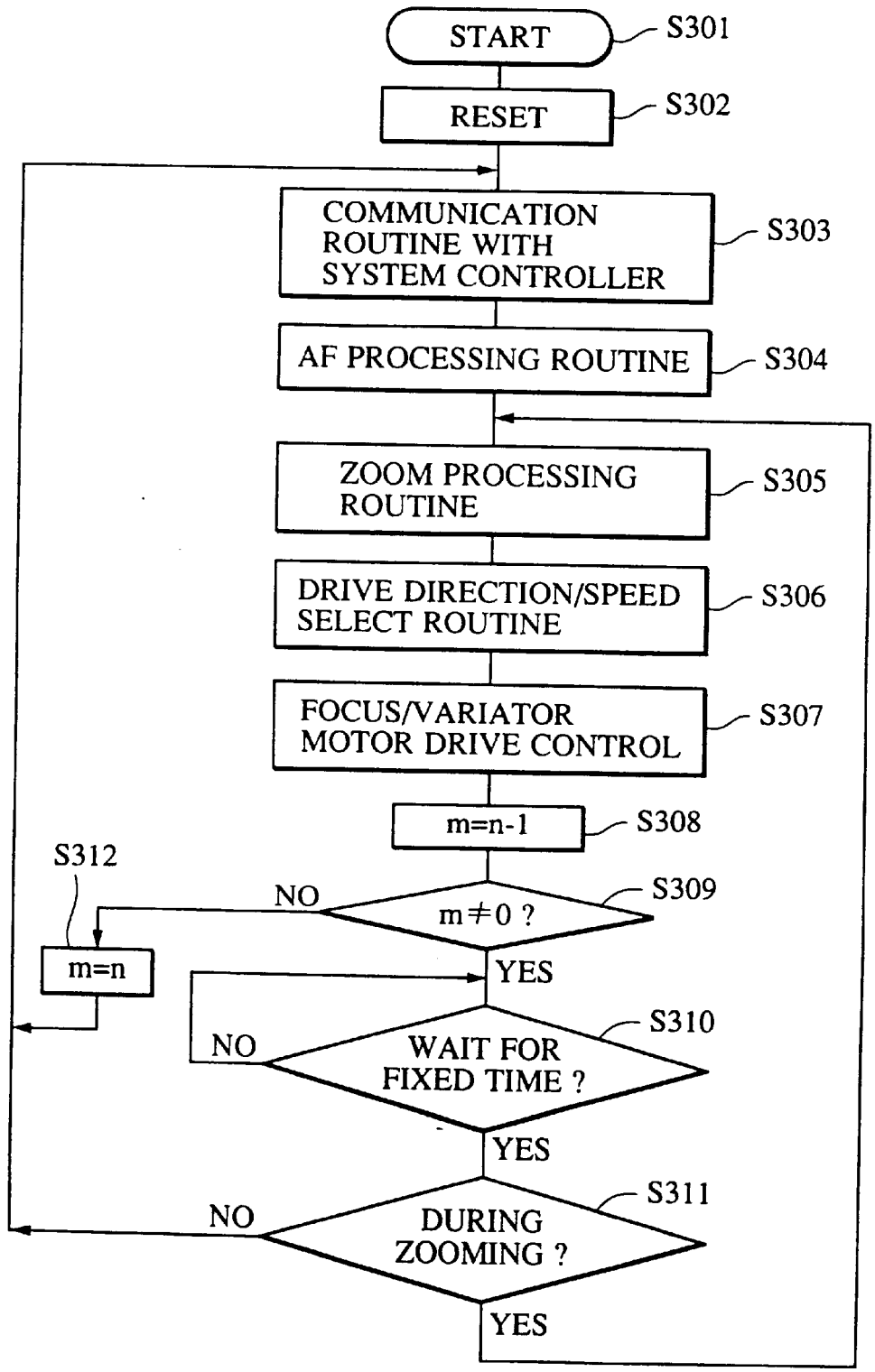

ZOOM SPEED VARIATION

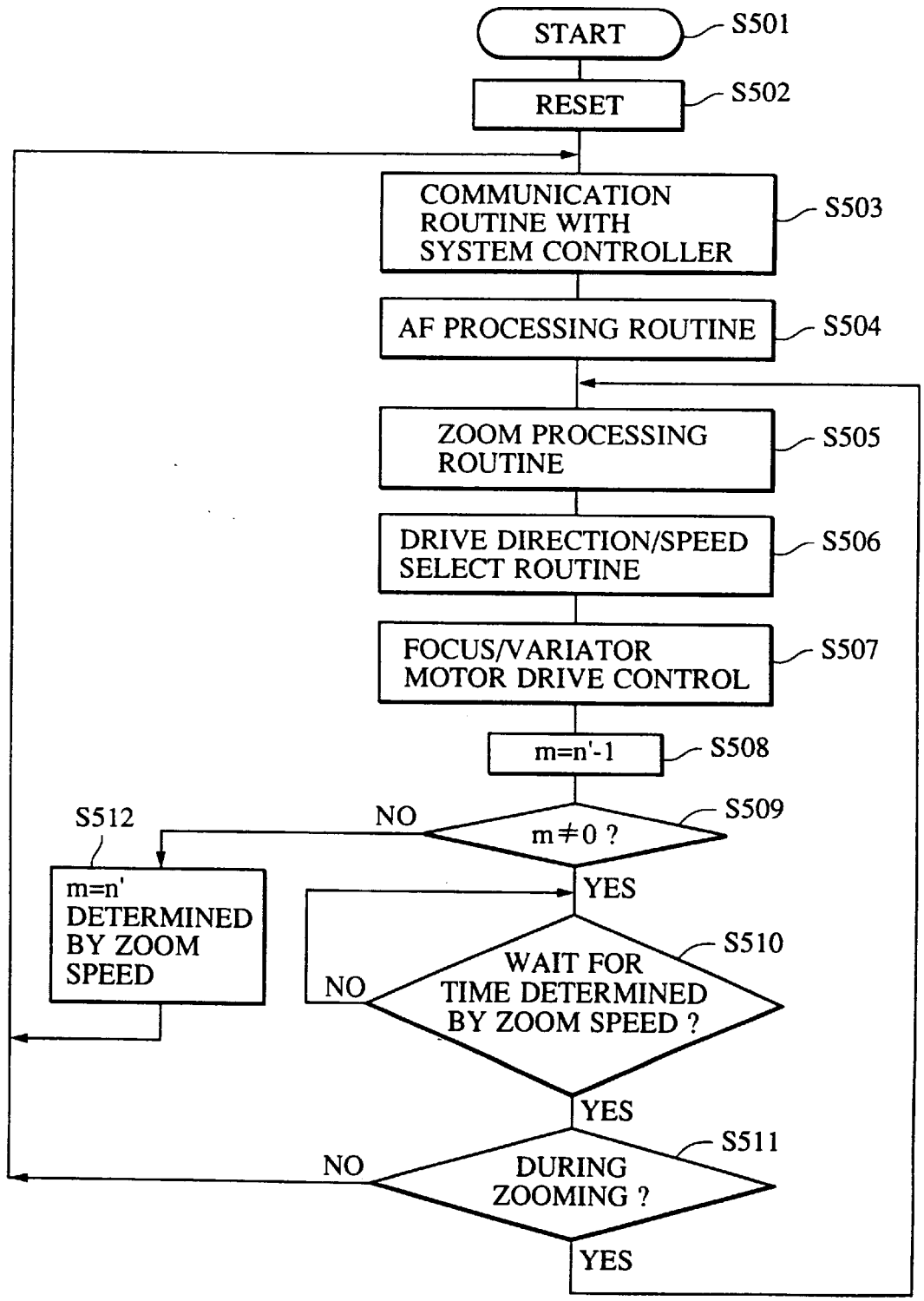

LENS CONTROL APPARATUS, LENS CONTROL METHOD, AND VIDEO CAMERA HAVING SAME

This is a continuation application of application Ser. No. 08/615,815 filed Mar. 14, 1996 now U.S. Pat. No. 6,184,932.

BACKGROUND OF THE INVENTION

1. Field of the Invention

The present invention relates to a lens control apparatus to be preferably used in a video camera.

2. Description of the Related Art

Recently, video cameras or camcoders have become remarkably widespread, and many improvements have been made in performance, function, and operability thereof. Particularly, miniaturization thereof and increase in magnification of zooming are strongly demanded, and many attempts have been made to achieve them.

The reason why miniaturization of the video cameras is realized in these circumstances is that lenses of an internal focusing type which are small and capable of high-magnification zooming are adopted.

FIG. 1 schematically illustrates a configuration of a commonly used lens system of the internal focusing type.

Referring to FIG. 1, there are provided the first fixed lenses 101; the second lenses for varying magnification (hereinafter, referred to as a variator lens); a diaphragm 103, the third fixed lenses 104; the fourth lenses 105 (hereinafter, referred to as a focus lens) having both a focusing function and a so-called compensator (focus compensation) function of compensating for a shifting of a focal plane due to a magnification varying, and an image pick-up surface 106.

According to the lens system constructed as shown in FIG. 1, since the focus lens 105 has both the compensator function and focusing function, the position of the focus lens 105 for focusing on the image pick-up surface 106 varies with object distances even if focal lengths are equal. And, it is needless to say that the position of the focus lens 105 varies with the focal lengths even if the object distances are equal.

FIG. 2 is the plot of the position of the focus lens 105 for focusing on the image pick-up surface when the object distances are varied in each of the focal lengths. If a locus shown in FIG. 2 is selected in accordance with the object distance during magnification varying, and the focus lens 105 is shifted in accordance with the locus, a zooming without defocus becomes possible.

According to a lens system of a for-element focusing type, a compensator lens is provided separately from the focus lens with respect to the variator lens, and the variator lens and compensator lens are coupled by means of a mechanical cam ring. Therefore, when a knob for manual zooming is provided to vary the focal length manually, the cam ring follows the knob to rotate however fast the knob may be actuated, so that the variator lens and compensator lens shift along a groove of the cam ring. Thus, defocus is not caused by the zooming when the focus lens is in focus.

In a zoom control of the lens system of the internal focusing type having characteristics as described above, it is popular that a plurality of locus data shown in FIG. 2 are stored in a lens control microcomputer in one form or another, the locus of the focus lens is selected in accordance with the positions of the focus lens and variator lens, and the zooming is performed by tracing the selected locus.

Further, since the position of the focus lens with respect to the variator lens is read out from a memory device so as to be utilized for controlling the positions of the lenses, the position of each lens must be read out accurately to some extent. Particularly, as is also apparent from FIG. 2, the inclination of the locus of the focus lens varies every moment with the change of the focal length when the variator lens shifts with constant or nearly constant speed. This shows that the shifting speed and shifting direction of the focus lens change every moment. In other words, an actuator of the focus lens must perform accurate speed response from 1 Hz to several hundred Hz.

As an actuator which satisfies the above-described requirement, the use of a stepping motor in the focus lens of the internal-focusing lens system is becoming popular. Since the stepping motor rotates in complete synchronism with stepping pulses output from the lens control microcomputer or the like, and a stepping angle per pulse is constant, it is possible to obtain a high speed response, and stopping accuracy and position accuracy can be obtained.

In addition, the use of the stepping motor offers the following advantage. Since a rotation angle of the motor with respect to the number of stepping pulses is constant, the stepping pulse can be used as an incremental encoder, and there is no need to provide additionally a specific position encoder.

As described above, when the magnification varying is performed while maintaining in-focus with the use of the stepping motor, it is necessary to store the locus data of FIG. 2 in the lens control microcomputer or the like in one form or another (either the locus itself or a function having a variable of the lens position will do), read out the locus data in accordance with the position or the shifting speed of the variator lens, and then move the focus lens based on the data.

FIGS. 3A and 3B illustrate an example of the already proposed locus follow-up method.

FIG. 3B shows a memory table in the lens control microcomputer in which the locus data of FIG. 3A are stored. As apparent from FIG. 3B, shifting ranges of the variator lens and focus lens are split into a plurality of areas, and focus lens data a0, a1, . . . , b0, b1, . . . determined by the variator lens positions z0, z1, . . . and the object distance are stored in order. In FIG. 3B, v represents the variator lens position, n represents the object distance and each of the data Anv (n=0, 1. . . m; v=0, 1. . . s) are focus lens position data which are unitarily determined by the variator lens position and object distance.

In FIG. 3A, each of z0, z1, z2 . . . z6 represents the variator lens position; each of a0, a1, a2 . . . a6 and each of b0, b1, b2 . . . b6 represents typical loci of the focus lens stored in the lens control microcomputer. And, each of p0, p1, p2 . . . p6 represent the locus of the focus lens calculated from the above-described two loci. The locus is calculated by the following expression:

$$p(n+1)=|p(n)-a(n)|/|b(n)-a(n)|\cdot|b(n+1)-a(n+1)|+a(n+1) \qquad (1)$$

The expression (1) shows that when the focus lens is on p0, a ratio of a line segment b0-a0 divided internally by p0 is determined and a point which divides internally a line segment b1-a1 in accordance with the above ratio is taken as p1. A standard shifting speed of the focus lens for maintaining infocus can be found from the position difference between p1 and p0, and the time involved in shifting of the variator lens from z0 to z1.

A case will now be described where there is no restriction such that the variator lens should stop only on the border having the stored typical locus data. FIG. 4 is a view for explaining an interpolation method of the variator lens position in which a part of FIG. 3A is extracted and the variator lens is at the voluntary position.

In FIG. 4, the vertical axis represents the focus lens position and the horizontal axis represents the variator lens position, respectively, and the typical locus positions (the focus lens position with respect to the variator lens position) stored in the lens control microcomputer are represented by a0, a1 . . . ak−1, ak . . . an and b0, b1 . . . bk−1, bk . . . bn according to the object positions when the variator lens positions are Z0, Z1 . . . Zk−1, Zk . . . Zn, respectively.

When the variator lens is on Zx which is not the zoom border and the focus lens position is px, ax and bx are determined by the following expressions:

$$ax=ak-(Zk-Zx)(ak-ak-1)/(Zk-Zk-1) \quad (2)$$

$$bx=bk-(Zk-Zx)(bk-bk-1)/(Zk-Zk-1) \quad (3)$$

That is, ax and bx can be determined by internally dividing one of the four stored typical locus data (ak, ak−1, bk, and bk−1 in FIG. 4) of the same object distance by the internal division ratio obtained from the present variator lens position and two zoom border positions (for example, Zk and Zk−1 of FIG. 4) which sandwich the present variator lens position. And, pk and pk−1 can be determined by internally dividing one of the four stored typical locus data (ak, ak−1, bk, and bk−1 in FIG. 4) of the same object distance by the internal division ratio obtained from ax, px and bx of expression (1). When zooming from a telephoto side to a wide view side, a shifting speed of the focus lens for maintaining in-focus can be found from the difference between the follow-up position pk of the focus lens and the present position px of the focus lens, and the time involved in shifting of the variator lens from Zx to Zk. When zooming from a wide view side to a telephoto side, the standard shifting speed of the focus lens for maintaining in-focus can be found from the difference between the follow-up position pk−1 of the focus lens and the present position px of the focus lens, and the time involved in shifting of the variator lens from Zx to Zk−1. The locus follow-up method as described above already has been proposed.

FIG. 5 is a flowchart showing a control of the above-described system which is usually processed in a lens control AF (automatic focusing) microcomputer. The processing is started from S1. A reset routine S2 resets RAM and various ports in the AF microcomputer. A communication routine S3 exchanges data of a zoom switch instructing the zooming and data of magnification varying, such as a variator lens position, with a system control microcomputer (hereinafter, referred to as a system controller). An AF processing routine S4 processes a sharpness signal of an AF evaluation signal to perform automatic focusing in accordance with a change in the evaluation signal. A zoom processing routine S5 is a routine for processing an operation of a compensator lens to maintain in-focus during the zooming. In this routine, a standard drive direction and a standard drive speed of the focus lens which traces the locus shown in FIG. 3 are calculated.

A drive direction/speed select routine S6 selects the drive directions and drive speeds of the variator lens and focus lens calculated in S4 and S5 in accordance with the automatic focusing and magnification varying. This routine prevents the lenses from being driven beyond the telephoto end, beyond the wide view end, beyond the closest end and beyond the infinity end which are specified on the program, so that the lenses do not butt against mechanical ends. S7 outputs a control signal to a motor driver in accordance with the data of the drive directions and drive directions of the variator lens and focus lens determined in the routine S6; so as to control drive/stop of the lenses. After completion of processing in S7, the procedure returns to the routine S3. A series of processing in FIG. 5 are performed in synchronization with a vertical-synchronizing signal (the processing in S3 waits for the next vertical-synchronizing signal to come). That is, in a video camera, since focus data for automatic focusing is detected in a field cycle (a cycle of the vertical-synchronizing signal), a flow of the control also synchronizes to the vertical-synchronizing signal and is repeatedly performed in the cycle.

However, because zoom speed has increased in recent years, the variator lens shifts, for example, from Z4 to Z6 in FIG. 3A during the vertical-synchronizing period. Thus, when the above-described operation is performed once during the vertical-synchronizing period, the focus lens shifts from p4 to p6' to defocus by p6'−p6, whereby the locus can not be traced exactly during the zooming. The term "vertical-synchronizing period" means a cycle of the vertical-synchronizing signal, i.e. a field period.

SUMMARY OF THE INVENTION

It is an object of the present invention to provide a video camera which enables the focus lens to follow exactly zooming even if zoom speed is high.

It is another object of the present invention to allow the compensator lens to follow the zooming with high accuracy.

According to a preferred embodiment of the invention, there is provided a video camera comprising a variator lens; a focus lens; drive means for shifting the variator lens and focus lens separately toward the optical axis; storage means for storing in-focus position data in each object distance of the focus lens with respect to the variator lens; calculation means for calculating a shifting speed of the focus lens when shifting the variator, lens based on the in-focus position stored in the storage means; and control means for controlling the drive means based on outputs of the calculation means, wherein the calculation means and control means are actuated a plurality of times in one vertical-synchronizing period.

According to another preferred embodiment of the invention, there is provided a video camera wherein the number of times calculation and control is performed during the vertical-synchronizing period is determined in accordance with the shifting speed of the variator lens.

According to a further preferred embodiment of the invention, there is provided a lens control apparatus, such as that of a video camera, wherein the calculation of the shifting speed of the focus lens when there is shifting of the variator lens, and control of shifting of the focus lens by the calculation results, are performed a plurality of times in one vertical-synchronizing period.

Further objects, features and advantages of the present invention will become apparent from the following description of the preferred embodiments with reference to the attached drawings.

BRIEF DESCRIPTION OF THE DRAWINGS

FIGS. 3A and 3 illustrate an example of a locus follow-up method;

FIG. 5 is a flowchart showing a conventional system control;

FIG. 8 is a flowchart showing an operation of a second embodiment the present invention;

FIG. 10 is a flowchart showing an operation of a third embodiment of the present invention.

DETAILED DESCRIPTION OF THE PREFERRED EMBODIMENTS

The preferred embodiments of the video camera system according to the present invention will now be described in detail.

First Embodiment

Figure 6A:
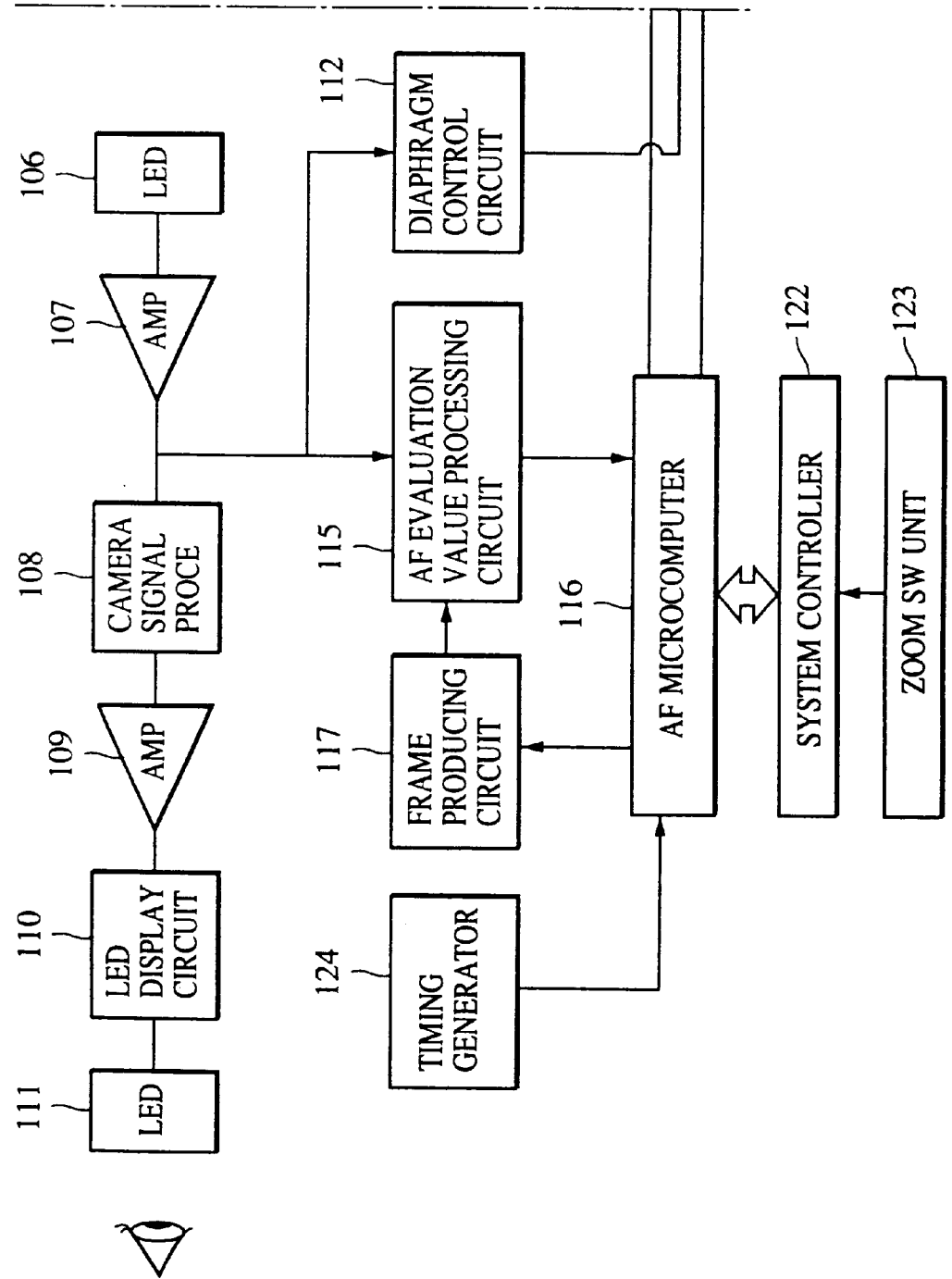
FIG. 6 is a block diagram showing a configuration of a first embodiment of the present invention.
Figures 6, 6B:
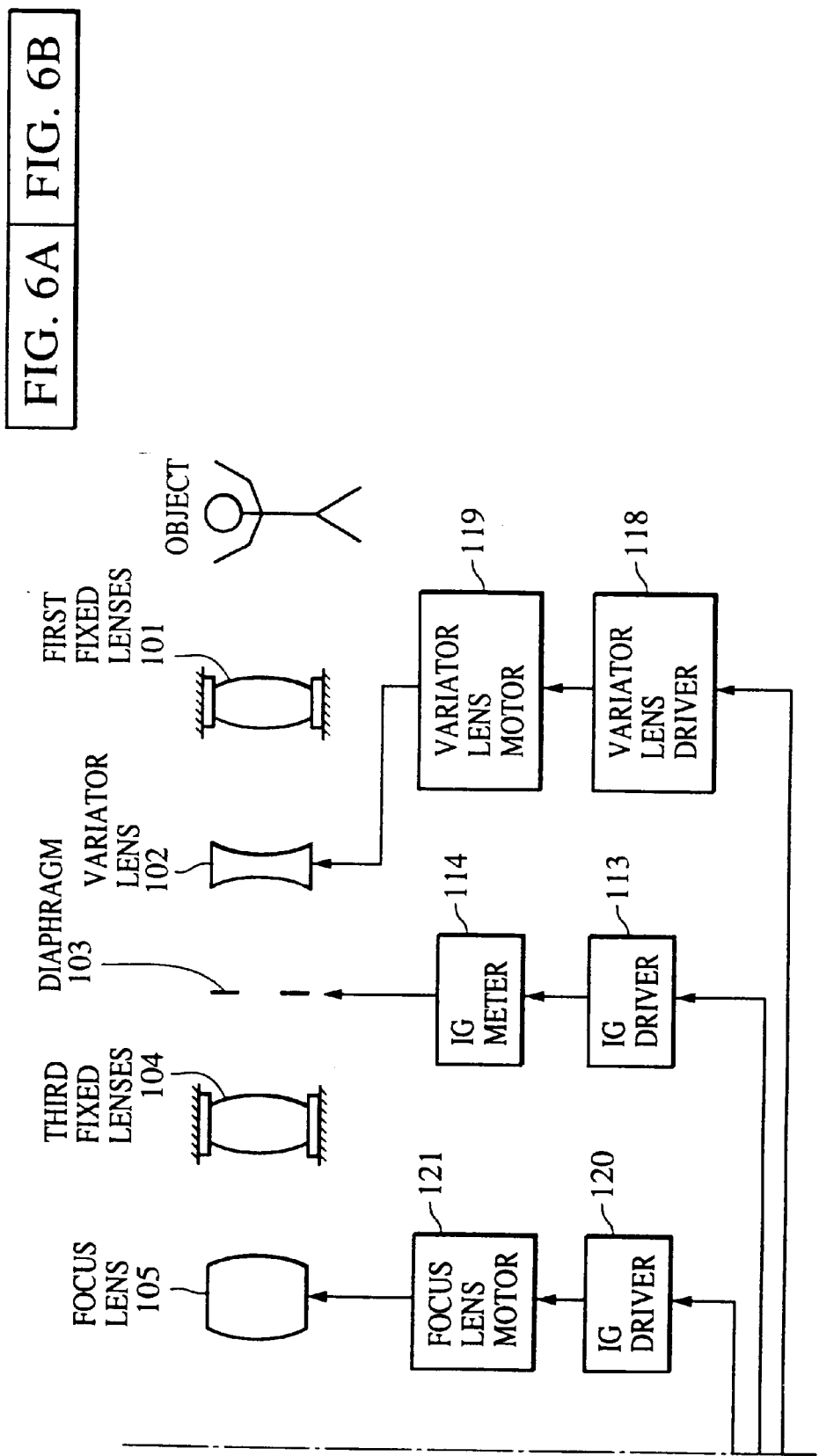

FIG. 6 is a block diagram showing a configuration of a video camera to which a first embodiment of the present invention is applied.

Referring to FIG. 6, there are provided components of an internal focusing type lens system such as first fixed for-element lenses 101, second lenses 102 for varying magnification (variator lens), a diaphragm 103, third fixed lenses 104, and fourth lenses (focus lens) 105 having both a compensation function and a focusing function. An image light passed through the lens system is subject to an image formation on the surface of an image pick-up element 106, and is converted into an image signal by a photoelectric conversion. There are also provided an amplifier (or an impedance converter) 107 and a camera signal processing circuit 108. The image signal processed therein is amplified by the amplifier 109 to a prescribed level, processed by a LCD (liquid crystal display) display circuit 110 and then, displayed as a pick-up image by an LED 111.

On the other hand, the image signal amplified by the amplifier 107 is transmitted to a diaphragm control circuit 112 and an AF evaluation value processing circuit 115. The diaphragm control circuit 112 drives an IG driver 113 and an IG meter 114 in accordance with an input level of the image signal to control the diaphragm 103, thereby adjusting the quantity of light.

The AF evaluation value processing circuit 115 extracts and processes only a high frequency component of the image signal within a focusing frame in a screen in accordance with a gate signal from a focusing frame producing circuit 117. An AF microcomputer 116 controls a focusing frame for driving and controlling a lens and for varying a focusing area in accordance with the strength of an AF evaluation signal. In addition, the AF microcomputer 116 communicates with a system controller 122, and the system controller 122 reads in operation data from various operating portions by means of an A/D converter and the like. For example, the AF microcomputer 116 and the system controller 122 exchange data of a zoom switch 123 (a unit zoom switch from which a voltage corresponding to a rotation angle of an operating member is output, thereby performing a variable-speed zooming) and data of a zoom operation, such as a direction of magnification varying and a focal length when zooming is controlled by the AF microcomputer 116. A timing generator 124 generates a vertical-synchronizing signal and inputs it into the AF microcomputer 116. A variator driver 118 and a focus lens driver 120 output, respectively, a drive energy to lens drive motors in accordance with instructions for driving the variator lens 102 and focus lens 105 output from the AF microcomputer 116. A variator lens motor 119 drives the variator lens 102; and a focus lens motor 121 drives the focus lens 105, respectively.

A method of driving the variator lens motor and focus lens motor will now be described when the variator lens motor 119 and focus lens motor 121 are stepping motors.

The AF microcomputer 116 determines drive speeds of each of the variator lens motor 119 and focus lens motor 121 by means of program manipulation, and sends the drive speeds as rotation speed signals of each of the stepping motors 119 and 121 to the variator lens driver 118 and focus lens driver 120. In addition, the AF microcomputer 116 sends drive/stop instruction signals and rotation direction instruction signals of each of the motors 119 and 121 to the drivers 118 and 120, respectively. With respect to the variator lens motor 119, the drive/stop and rotation direction signals are output to the driver 118 mainly in accordance with a state of the zoom switch 123. With respect to the focus lens motor 121, these signals are output to the driver 120 in accordance with drive instruction determined by processing in the microcomputer 116 when there is automatic focusing and zooming. Each of the drivers 118 and 120 set excitation phases of the 4-phase motor for forward or backward rotations in accordance with the rotation direction signals, and output frequencies of pulse signals and voltages (or currents) to be applied to four excitation phases while varying them, thereby on/off controlling the outputs to the motors 119 and 121 in accordance with drive/stop instruction while controlling the rotation directions and rotation speeds of the motors.

Figure 7:
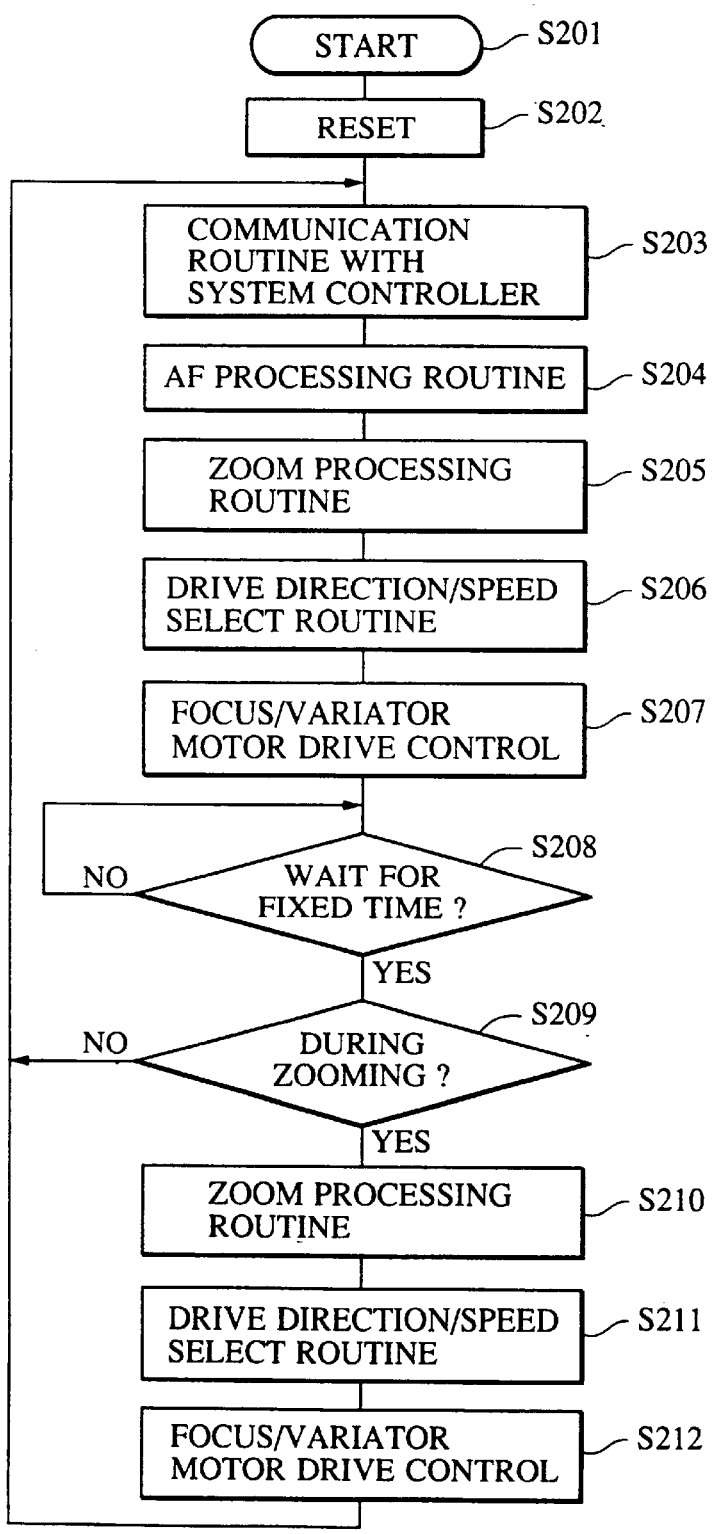
FIG. 7 is a flowchart showing an operation of the first embodiment of the present invention.

FIG. 7 is a flowchart showing an operation of the first embodiment which is processed in the AF microcomputer 116 performing a lens control. The processing is started from S201. A reset routine S202 resets RAM and various ports in the AF microcomputer 116. A communication routine S203 exchanges data of zoom switch 123 and data of magnification varying, such as a position of the variator lens 102 with the system controller 122. An AF processing routine S204 extracts high frequency components and the like from the image signal to generate a sharpness signal, obtains peak values and internal values of the sharpness signal, to generate an evaluation signal and further, performs automatic focusing in accordance with a change in the evaluation signal. A zoom processing routine S205 is a routine for processing an operation of a compensator lens for maintaining in-focus during the zooming. In this routine, a drive direction and a drive speed of the focus lens 105, which traces the locus shown in FIGS. 3 and 4 and maintains in-focus, are calculated.

A drive direction/speed select routine S206 selects the drive directions and drive speeds of the variator lens and focus lens calculated in the routines S204 and S205 in accordance with the automatic focusing and zooming. This routine prevents the lenses from being driven beyond the telephoto end, beyond the wide view end, beyond the closest end, and beyond the infinity end, which are specified on the program so that the lenses do not butt against mechanical ends. S207 outputs a control signal to the lens drivers 118 and 120 in accordance with the data of the drive directions and drive speeds of the variator lens and focus lens determined in the routine S206, so as to control drive/stop of the lenses. S208 waits for the fixed time to elapse, corresponding to the period required to reach the middle point of the vertical-synchronizing period. Since the position of the variator lens is renewed when the zooming is being performed in S209, a zoom processing is performed in a routine S210 to calculate the drive direction and the drive speed of the focus lens 105 as shown in FIGS. 3 and 4. A routine S211 prevents the lenses from being driven beyond the telephoto end, beyond the wide view end, beyond the closest end, and beyond the infinity end, which are specified on the program so that the lenses do not butt against mechanical ends by the drive directions and drive speeds of the variator lens and focus lens calculated in the routine S210. A routine S212 outputs control signals to the lens drivers 118 and 120 in accordance with data of the drive directions and drive speeds of the variator lens and focus lens to control drive/stop of the lenses. After completion of processing in S212, the procedure returns to S203. A series of processing in FIG. 7 are performed in synchronization with the vertical-synchronizing signal (the processing in S203 waits for the next vertical-synchronizing signal to come).

Figure 1:
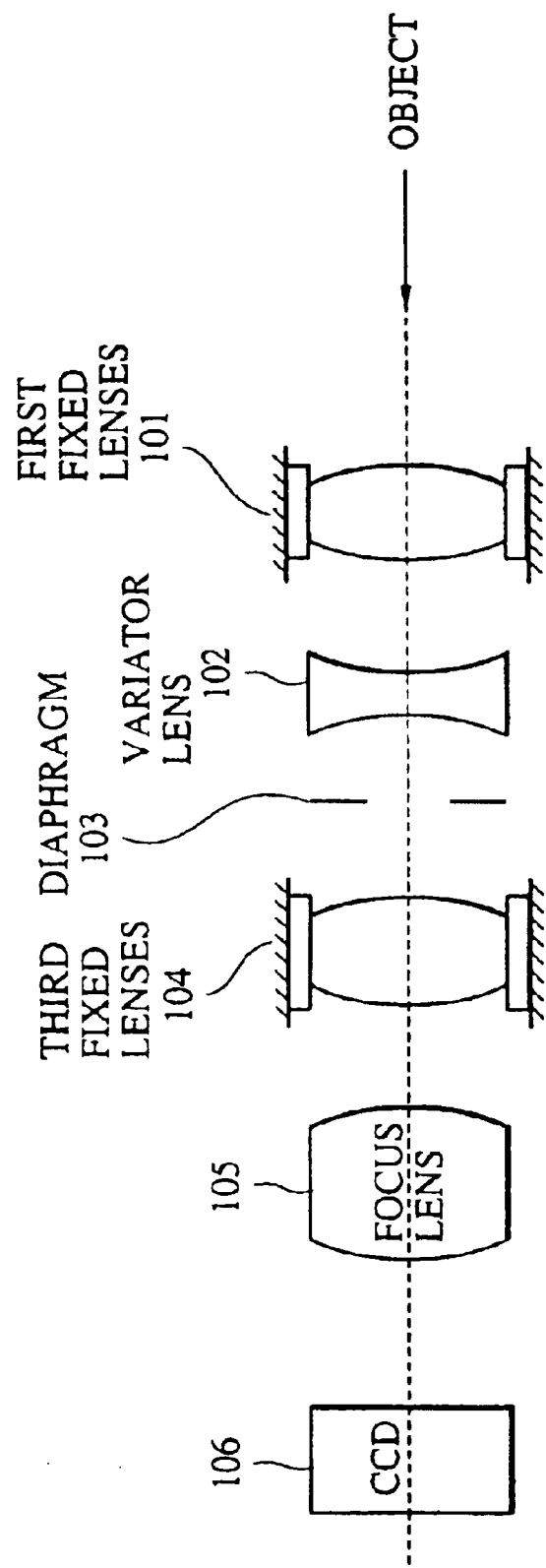
FIG. 1 illustrates a configuration of a lens system of an internal focusing type.
Figure 2:
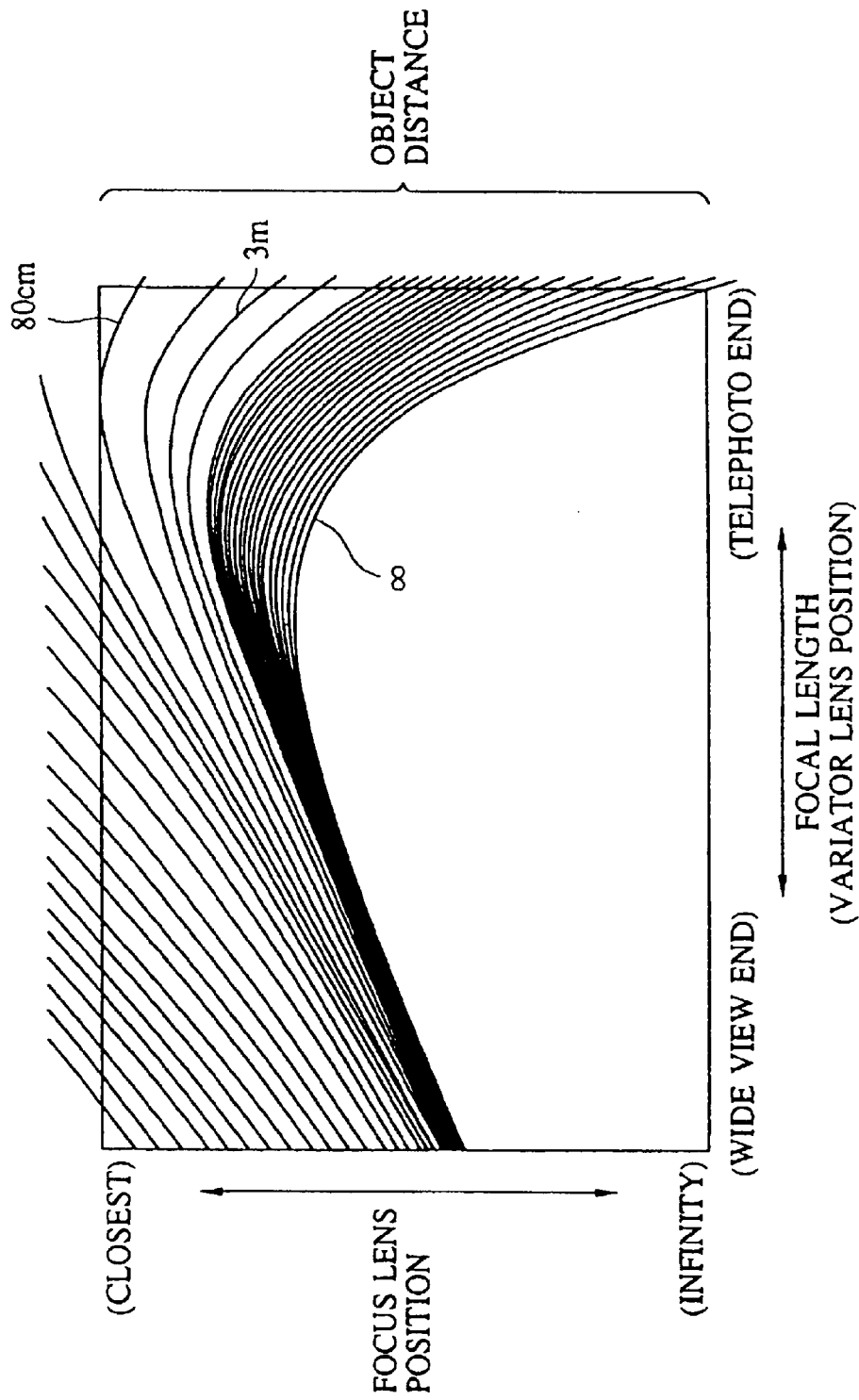
FIG. 2 illustrates an example of lens locus data to be used for controlling the internal focusing type lens system.
Figures 3A, 3B:
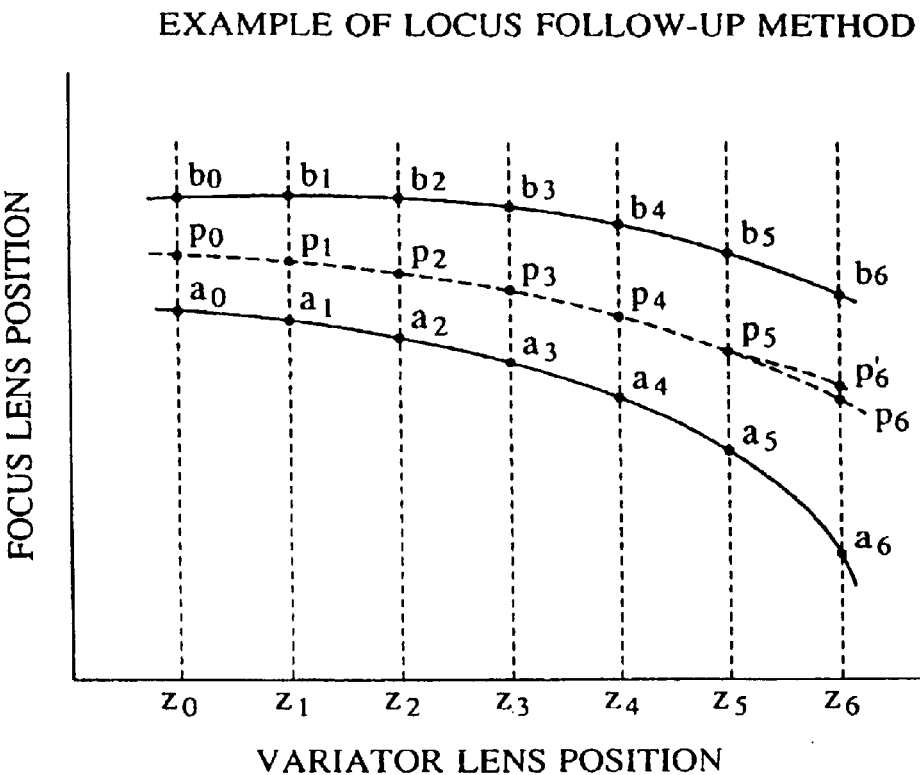
Figure 4:
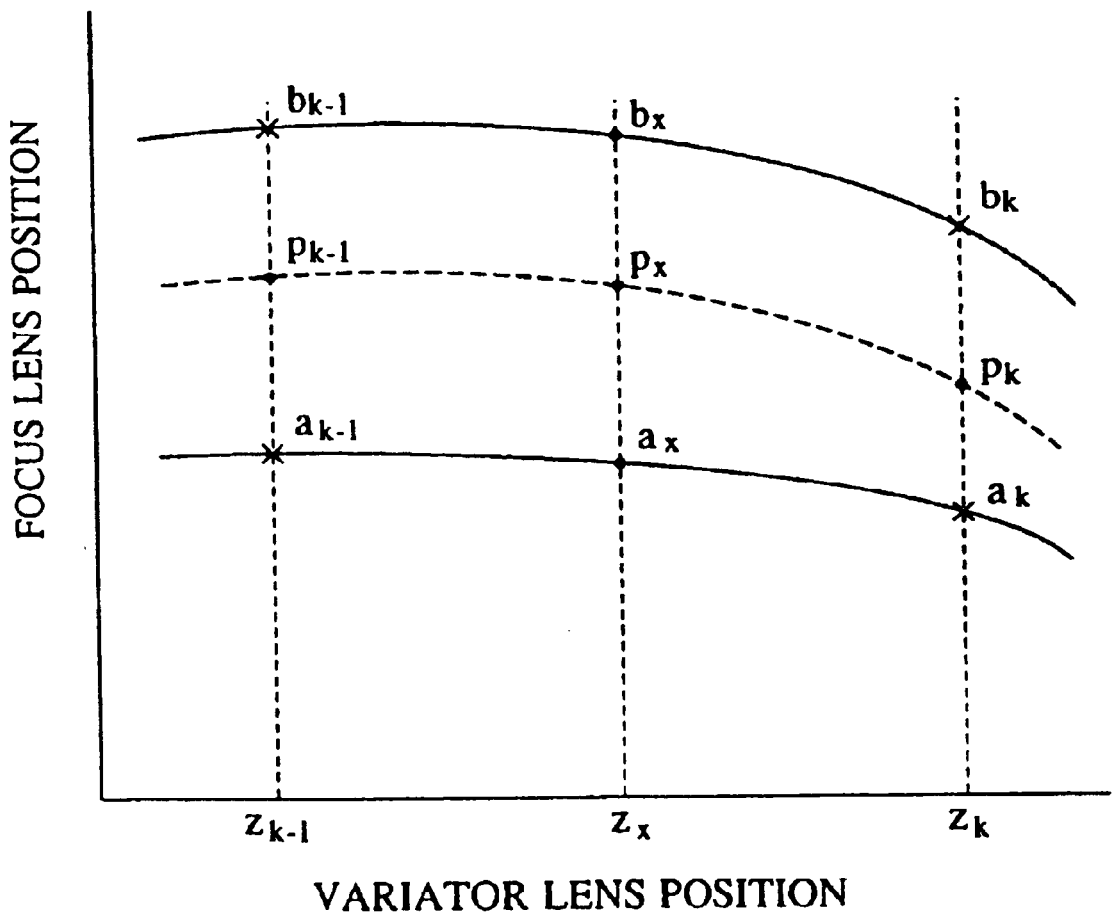
FIG. 4 illustrates an example of an interpolation method of calculating a variator lens position in a shifting direction.

If a follow-up speed of the focus lens is calculated once during the vertical-synchronizing period while zooming so as to drive the focus lens, the focus lens speed shows inclinations p4 and p5 when the variator lens shifts from the position Z4 to the position Z6 during the vertical-synchronizing period in FIG. 3A, and the focus lens shifts to the position p6' after one vertical-synchronizing period, thereby making it difficult to trace the locus of the focus lens. However, when the follow-up speed of the focus lens is calculated two times as described in this embodiment, the focus lens speed shows inclinations p4 and p5 in the first half of the vertical-synchronizing period, passes p5 and shows the inclinations p5 and p6 and then, reaches p6. Thus, the locus of the focus lens can be exactly traced, and the compensator lens can follow the zooming to compensate with high accuracy for the in-focus positions varying with the drive of the variator lens, so that in-focus can be securely maintained.

Second Embodiment

It is described in the first embodiment that the zoom processing routine, drive direction/speed select routine and motor drive control of the variator lens and focus lens are performed two times within the vertical-synchronizing period, so as to allow the focus lens to follow exactly the zooming. However, according to a method of the first embodiment, it is difficult for the focus lens to follow the zooming exactly in the case where the zoom speed is faster and, for example, the variator lens shifts from the position Z3 to the position Z6 during the vertical-synchronizing period in FIG. 3A. Thus, a method for allowing the focus lens to follow the zooming exactly in the case of higher speed zooming will now be described in the second embodiment.

FIG. 8 is a flowchart showing an operation of the second embodiment.

The second embodiment is different from the first embodiment in that the processing from S308 to S312 is included in the flowchart which perform calculations shown in FIGS. 3 and 4 at the specified number of times m in the zoom processing routine S305 to obtain the focus lens follow-up speed, set the drive directions and speeds of the variator lens and focus lens, and drive the variator lens motor and the focus lens motor. The specified number of times m may be the number of times falling within the vertical-synchronizing period. S308 counts the specified number of times, and whether or not the specified number of times is n times is judged in S309. If not n times, the procedure advances to S310 to wait for the fixed time to elapse. The fixed time is determined by the vertical-synchronizing period, specified number of times m, and processing times from the routine S305 to S307.

As described above, the performance of the processing S305 to S307 at m=n times during the vertical-synchronizing period enables the focus lens to follow exactly the zooming, even in higher speed zooming.

Third Embodiment

Figure 9A:
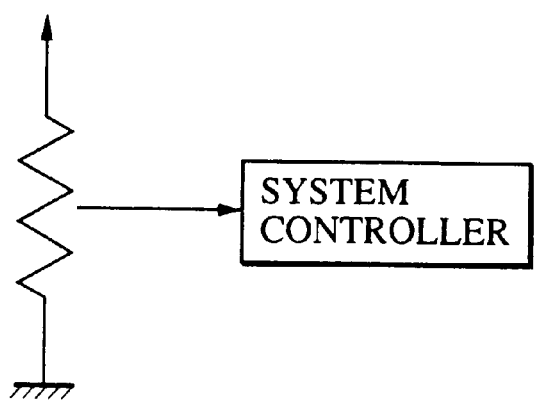
FIG. 9 illustrates a zoom speed variation.
Figure 9B:
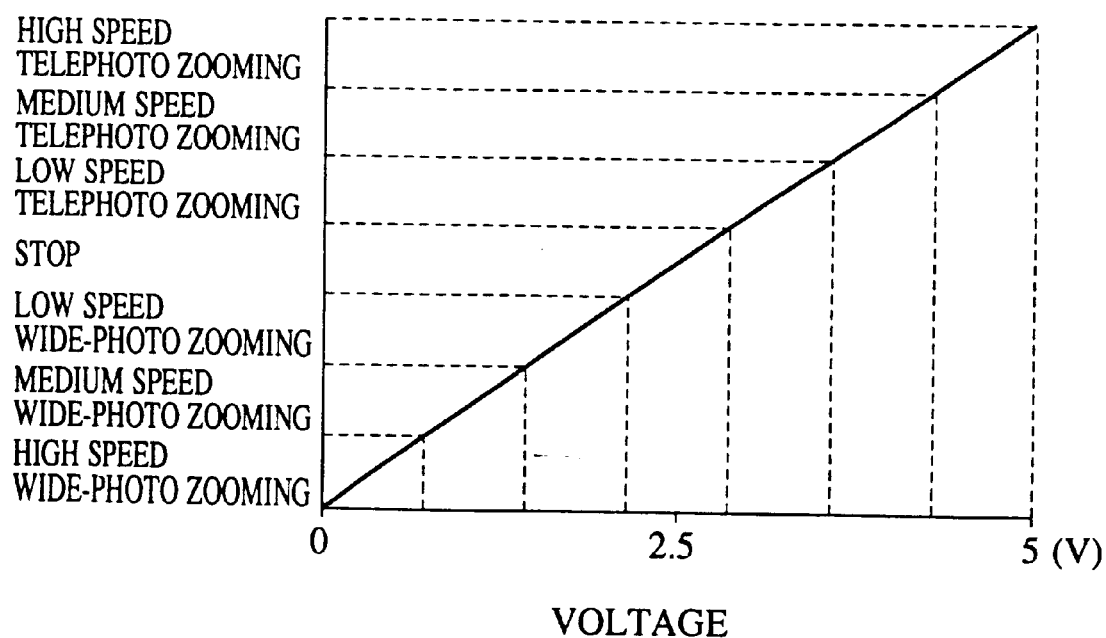

In the second embodiment, it is described that the zoom processing routine, drive direction/speed select routine and motor drive control of the variator lens and focus lens are performed m=n times during the vertical-synchronizing period, in order to allow the focus lens to follow exactly the zooming even during high speed zooming. Recently, however, the zoom speed has become variable. For example, the zoom switch 123 consists of a variable resistance as shown in FIG. 9A, and a voltage value thereof is input to the system controller to perform A/D conversion, thereby determining the zoom speed. As shown in FIG. 9B, the zooming is stopped at the intermediate value of the voltage of about 2.5 V. When the voltage value is smaller than the intermediate value, a wide-view zooming is effected. Wide-view zooming is performed at higher speeds when the voltage value is smaller. When the voltage value is larger than the above-described intermediate value, telephoto zooming is effected. Telephoto zooming is performed at higher speeds when the voltage value is larger. Although the zoom speed is divided into three steps of low speed, medium speed and high speed in this embodiment, it can be subdivided into steps. In case there are any kinds of zoom speed, if the specified number of times m is fixed to n times, the condition arises in which n times are not required during low speed zooming, and n times are insufficient during the high speed zooming. Thus, setting of the specified number of times m matched with the zoom speed allows the focus lens to follow the zooming at any zoom speed. An example thereof will be described as a third embodiment.

FIG. 10 is a flowchart showing an operation of the third embodiment.

The third embodiment is different from the second embodiment in that S510 and S512 are included in the flowchart. In S512, the specified number of times m is set to n' determined by the zoom speed. During low speed zooming, n' is reduced, and during high speed zooming, n' is increased. In S510, a fixed time is determined by the specified number of times m, which is determined by the vertical-synchronizing period and zoom speed.

As described above, the number of times for carrying out processing from S505 to S507 during the vertical-synchronizing period is changed by the zoom speed to set an optimum specified number of times for the zoom speed at that time, thereby allowing the focus lens to follow exactly the zooming at any zoom speed.

Modification

In each of the above-described embodiments, the zooming is performed by operating members of the video camera itself. However, a video camera system according to the present invention can also be implemented in performing the zooming by a remote controller and the like. In addition, in each of the embodiments, a vertical-synchronizing signal is generated in the video camera. However, a video camera system according to the present invention can also be implemented by inputting the vertical-synchronizing signal from outside.

As described above, according to the embodiments, it is possible to allow the focus lens to follow the zooming, even if the zoom speed is high.

In addition, according to other embodiments, the focus lens follow-up speed and direction are calculated and controlled a plurality of times in one cycle of the vertical-synchronizing signal of the video camera during the zooming. Thus, it is possible to allow the focus lens to follow the zooming with high accuracy, regardless of the zoom speed.

Furthermore, generation of defocus due to follow-up delay of the focus lens during the zooming can be prevented, thereby obtaining excellent image quality.

What is claimed is:

1. A lens control apparatus, comprising:
   a variator lens for varying magnification;
   driving means for driving said variator lens;
   a focus lens for varying focal positions;
   driving means for driving said focus lens;
   focus detecting means for detecting a focus condition in a predetermined period of time; and
   control means for controlling a driving operation of said focus lens to compensate for focal positions which vary in accordance with a driving operation of said variator lens and the focus condition detected by said focus detecting means, wherein, a plurality of times during the predetermined period, said control means calculates a focus lens adjustment in accordance with movement of said variator lens, and adjusts the movement of said focus lens in accordance with the calculated focus lens adjustment.

2. A lens control apparatus according to claim 1, wherein said control means includes a memory for storing a plurality of shifting focus data of said focus lens, a plurality of variator lens positions, and a plurality of focus lens positions, and wherein said control means selects shifting focus data from said memory corresponding to positions of said variator lens and said focus lens, when said control means controls the driving operation of said focus lens.

3. A lens control apparatus according to claim 2, wherein said control means calculates shifting focus data which are not stored in said memory using a plurality of shifting focus data stored in said memory, when said control means controls the driving operation of said focus lens.

4. A lens control apparatus according to claim 1, further comprising magnification-varying speed control means for varying a drive speed of said variator lens, wherein said control means, in accordance with the drive speed of said variator lens, varies the number of times for controlling the driving operation of said focus lens during the predetermined period.

5. A lens control apparatus according to claim 4, wherein said magnification varying speed control means controls the drive speed of said variator lens, and when the drive speed of said variator lens is set to high, said magnification-varying speed control means controls the drive speed of said variator lens a greater number of times than when the drive speed of said variator lens is set to low.

6. A lens control apparatus according to claim 1, wherein said focus lens is a compensator lens.

7. A video camera apparatus, comprising:
   a variator lens for varying magnification;
   a zoom driver that drives said variator lens;
   a focus lens for varying focal positions;
   a focus driver that drives said focus lens; and
   a microcomputer that controls a driving operation of said focus lens to compensate for focal positions which vary in accordance with a driving operation of said variator lens, wherein, a plurality of times during a producing period of an image signal, said microcomputer (i) calculates a focus lens adjustment in accordance with movement of said variator lens, and (ii) adjusts movement of said focus lens in accordance with the calculated focus lens adjustment.

8. A video camera apparatus according to claim 7, wherein said microcomputer includes a memory for storing a plurality of shifting focus data of said focus lens, a plurality of variator lens positions, and a plurality of focus lens positions, and wherein said microcomputer selects shifting focus data from said memory corresponding to positions of said variator lens and said focus lens, when said microcomputer controls the drive of said focus lens.

9. A video camera apparatus according to claim 7, wherein said microcomputer calculates shifting positions of said focus lens based on said selected shifting focus data for controlling said focus lens.

10. A video camera apparatus according to claim 8, wherein said microcomputer calculates shifting focus data which are not stored in said memory using a plurality of shifting focus data stored in said memory, when said microcomputer controls said focus lens.

11. A video camera apparatus according to claim 7, further comprising:
    magnification-varying speed control means for varying a drive speed of said variator lens, wherein said microcomputer varies a number of times said microcomputer adjusts said focus lens during the producing period of the image signal in accordance with the drive speed of said variator lens.

12. A lens control method, comprising the steps of:
    driving a variator lens to vary a magnification;
    driving a focus lens to vary focal positions;
    detecting a focus condition in a predetermined period of time; and
    controlling a driving operation of the focus lens to compensate for focal positions which vary in accordance with a driving operation of the variator lens and the focus condition detected in said focus detecting step, and, a plurality of times during the predetermined period, (i) a focus lens adjustment in accordance with movement of the variator lens, and (ii) adjusting movement of the focus lens in accordance with the calculated focus lens adjustment.

13. A lens control method according to claim 12, wherein said controlling step includes selecting and reading out shifting focus data corresponding to positions of the variator lens and the focus lens from a memory which stores a plurality of shifting focus data of the focus lens corresponding to positions of the variator lens and the focus lens during a zooming operation.

14. A lens control method according to claim 13, wherein said controlling step calculates shifting focus data which are not stored in the memory using a plurality of shifting focus data stored in the memory during a zooming operation.

15. A lens control apparatus, comprising:
    a variator lens for varying magnification;
    a focus lens for adjusting a focal position;
    focus detecting means for detecting a focus condition in a predetermined period of time; and
    calculating means for periodically performing a first calculation for calculating an adjusting value of said focus lens for compensating a change of the focal position caused by a drive of said variator lens and a second calculation for calculating an adjusting value of said focus lens basis on an output of said focus detecting means;
    wherein a cycle of a first calculation is shorter than a cycle of a second calculation.

16. An apparatus according to claim 15, wherein said calculating means includes a memory for storing a plurality of shifting locus data of said focus lens specified on the basis of positions of said variator lens and focus lens positions, and further comprising control means to drive said focus lens according to the specified locus data during a zooming operation of said variator lens.

17. An apparatus according to claim 16, wherein said calculating means calculates shifting locus data which are not stored in said memory using a plurality of shifting locus data stored in said memory, when said control means controls said focus lens.

18. A lens control apparatus according to claim 15, further comprising magnification-varying speed control means for varying the drive speed of said variator lens, wherein said magnification-varying speed control means, in accordance with the drive speed of said variator lens, varies the number of times for controlling the drive of said focus lens during the predetermined period.

19. An apparatus according to claim 18, wherein said magnification-varying speed control means controls the drive speed of said variator lens, and when the speed of said variator lens is set to high, said magnification-varying speed control means controls the drive speed of said variator lens a greater number of times than when the speed of said variator lens is set to low.

* * * * *

UNITED STATES PATENT AND TRADEMARK OFFICE
CERTIFICATE OF CORRECTION

PATENT NO. : 6,781,633 B2
DATED : August 24, 2004
INVENTOR(S) : Taeko Tanaka

It is certified that error appears in the above-identified patent and that said Letters Patent is hereby corrected as shown below:

<u>Title page,</u>
Item [73], Assignee, "Kabushki" should read -- Kabushiki --.
Item [63], Related U.S. Application Data, "Continuation" should read -- Divisional --.
Item [*] Notice, "248 days." should read -- 325 days. --.

<u>Column 1,</u>
Line 5, "Continuation" should read -- Divisional --.

<u>Column 2,</u>
Line 51, "represent" should read -- represents --.
Line 61, "infocus" should read -- in-focus --.

<u>Column 3,</u>
Line 33, "of" should be deleted.

<u>Column 4,</u>
Line 18, "can not" should read -- cannot --.
Line 43, "is" should read -- are --.
Line 64, "and 3" should read -- and 3B --.

<u>Column 5,</u>
Line 24, "for-" should be deleted.

<u>Column 7,</u>
Line 13, "processing" should read -- processings --.
Line 54, "perform" should read -- performs --.
Line 67, "routine" should read -- routines --.

<u>Column 10,</u>
Line 65, "means;" should read -- means, --.

UNITED STATES PATENT AND TRADEMARK OFFICE
CERTIFICATE OF CORRECTION

PATENT NO. : 6,781,633 B2
DATED : August 24, 2004
INVENTOR(S) : Taeko Tanaka

It is certified that error appears in the above-identified patent and that said Letters Patent is hereby corrected as shown below:

Column 11,
Lines 3, 6, 9 and 10, "locus" should read -- focus --.

Signed and Sealed this

Twenty-first Day of June, 2005

JON W. DUDAS
*Director of the United States Patent and Trademark Office*